United States Patent [19]

Hirayama

[11] Patent Number: 5,548,778

[45] Date of Patent: Aug. 20, 1996

[54] SYSTEM FOR ASSIGNING DEVICE TO BE CONNECTED TO COMPUTER WHEN ADDRESS FROM COMPUTER IS EFFECTIVE BY COMPARING ADDRESS FOR ENTIRE MEMORY SPACE AND FOUND COINCIDED

[75] Inventor: Katsuhiko Hirayama, Morioka, Japan

[73] Assignee: Vorax Incorporated, Moriokashi, Japan

[21] Appl. No.: 252,005

[22] Filed: May 31, 1994

[30] Foreign Application Priority Data

Jun. 1, 1993 [JP] Japan ..................................... 5-130776

[51] Int. Cl.$^6$ .................................................. G06F 15/40
[52] U.S. Cl. ........................ 395/823; 395/500; 364/221.8; 364/252.7; 364/256.2; 364/DIG. 1
[58] Field of Search ..................................... 395/500, 821, 395/823, 828, 829, 800

[56] References Cited

U.S. PATENT DOCUMENTS

| | | | |
|---|---|---|---|
| 4,707,802 | 11/1987 | Takahashi | 395/823 |
| 4,964,038 | 10/1990 | Louis | 395/829 |
| 4,979,144 | 12/1990 | Mizuta | 395/442 |
| 4,992,976 | 2/1991 | Yonekura et al. | 395/500 |
| 5,222,226 | 6/1993 | Yamaguchi et al. | 395/412 |
| 5,367,640 | 11/1994 | Hamilton et al. | 395/800 |
| 5,371,892 | 12/1994 | Petersen et al. | 395/700 |
| 5,444,852 | 8/1995 | Nakabayashi | 395/823 |

FOREIGN PATENT DOCUMENTS 3-160542  7/1991  Japan.

*Primary Examiner*—Thomas C. Lee
*Assistant Examiner*—Moustafa Mohamed Meky
*Attorney, Agent, or Firm*—Kanesaka & Takeuchi

[57] ABSTRACT

In an assignment of input-output memory space for selectively assigning a plurality of the input-output devices to be connected to a computer to the input-output memory space in a predetermined range, after a signal train data group including a combination of signal train data deliberately determined for every system of a computer to be used and signal train data at a time when a system is set up by any of the plurality of input-output devices is written in a storage area of the input-output device for assignment, the signal train data group is compared with a signal train data group previously stored in the input-output device. Only when they coincide with each other, an address assigned to said input-output device is written and held in the storage area.

4 Claims, 5 Drawing Sheets

SYSTEM FOR ASSIGNING DEVICE TO BE CONNECTED TO COMPUTER WHEN ADDRESS FROM COMPUTER IS EFFECTIVE BY COMPARING ADDRESS FOR ENTIRE MEMORY SPACE AND FOUND COINCIDED

BACKGROUND OF THE INVENTION

1. Field of the Invention

The present invention relates to an apparatus for assigning programable input-output memory space for an input-output device to be used by incorporating into a computer main unit.

2. Description of the Related Art

In general, in a computer, such as a personal computer, office computer and machinery-equipment computer, in addition to a computer main unit, input-output devices to be used by incorporating in the computer main unit are prepared for the purpose of extending functions for specific usage, such as image processing, communication processing and data collecting. As the input-output device, there is used an adaptor card or I/O board to be connected to an extension slot in a connecting section provided on the side of the computer main unit, from which a system bus and the like are outputted.

Incidentally, when a plurality of adaptor cards is used by incorporating into one computer, in general, separate input-output memory spaces are assigned to the respective adaptor cards. It is generally practiced that an assignment method comprises preparing a switch, for example, a dip switch for designating memory space to be assigned, and comparing contents of the switch and contents of an address bus contained in a system bus. And, at this time, the switch is carefully set so that the memory spaces to be assigned do not become same when a plurality of adaptor cards is incorporated.

However, since the above-mentioned switch for setting the assignment area for the input-output memory space in the adaptor card is different in a type and a setting method for every adaptor cards, when the switch is set, complicated operations referring to an instruction manual are required. More specifically, when an adaptor card is incorporated in a computer in which another adaptor card has already been incorporated, by reason that an instruction manual for setting a switch for the already incorporated adaptor card is unavailable, there has been a disadvantage that the additional adaptor card can not be set therein since a method for setting the switch for the additional adaptor card is not available.

Also, in general, since a switch for an adaptor card is set under a condition that a computer is turned off by reason of security, first, a power source of the computer is turned off, the switch for the adaptor card is set, and then the power source of the computer is again turned on to confirm whether setting of the switch is correctly carried out. If the setting of the switch is wrong, the above operations have to be repeated, resulting in complicated operations requiring much time and labour, and poor workability.

Therefore, in order to solve the above problems, a method for assigning input-output memory space which is programmable in a software, not relying on a switch, has been desired.

Incidentally, as a method for assigning input-output memory space which is programmable in a software, there has been proposed a method, wherein a specific control line is provided to every extension slot and, only when the control line is under an effective operation condition, data is written in a register which performs the same function as setting of a switch.

However, the above-described method is effective for only some computers where a specific signal is assigned to every extension slot, and the method can not be available for a large number of conventional computers which have widely been used.

Therefore, the present invention has been made based on the above-described problems, and is to provide a method and apparatus for assigning input-output memory space, wherein assignment of the input-output memory space can be performed by an extremely simple input operation with respect to all the ordinarily used computers in use with a plurality of input-output devices (adaptor cards).

SUMMARY OF THE INVENTION

According to a first aspect of the invention, in an assigning method of input-output memory space for selectively assigning a plurality of input-output devices to be connected to a computer to the input-output memory space in a predetermined range, there is obtained a method for assigning input-output memory space wherein after a signal train data group comprising a combination of signal train data deliberately determined for every system of a computer to be used and signal train data set when a system is set up by any of a plurality of input-output devices, is written in a storage area of the input-output device for assignment, the signal train data group thus written is compared with another signal train data group previously stored in the input-output device and, only when they coincide with each other, an address assigned to the input-output device is read and held in the storage area.

According to a second aspect of the invention, in an assignment apparatus of input-output memory space for selectively assigning a plurality of input-output devices to be connected to a computer to the input-output memory space in a predetermined range, there is obtained an assignment apparatus of the input-output memory space comprising:

signal train holding means wherein a signal train data group comprising a combination of signal train data deliberately determined for every system of the computer outputted onto a data bus from said computer by an input operation and signal train data set when a system is set up by any of the plurality of input-output devices, is written in a storage area of the input-output device to store and hold therein, signal train comparison means for outputting a coincidence signal when the signal train data group stored and held in the signal train holding means and the signal train data group previously set in the input-output device are compared and coincide with each other;

address holding means for writing in and storing an address on an address bus according to timing of a read-out signal from the computer while the coincidence signal is being inputted from the signal train comparison means; and address comparison means for outputting a tip selecting signal showing that the address is effective for the input-output device when the address stored and held in said address holding means and the address for an entire area of the memory space for the input-output device outputted on the address bus are compared and coincide with each other.

According to a third aspect of the present invention, in an assignment apparatus of input-output memory space as described in the second aspect, there is obtained an assignment apparatus of input-output memory space further comprising:

a switch for designating input-output memory space assigned to every input-output device;

switching means for outputting a switching signal for making the contents of the switch effective; and address switching means for outputting to the address comparison means an address when the contents of the switch and the address stored and held in the address holding means are compared and coincide with each other, upon receipt of a switching signal from the switching means.

According to a fourth aspect of the present invention, there is obtained an assignment apparatus of input-output memory space as described in the second or third aspect, further comprising operation control signal output means, wherein the operation for assigning the input-output memory space is started by an input signal formed of an enable signal for starting the assignment of the input-output memory space and a reset signal from the computer when a power source is turned on, and by the time when the signal train data group held in the signal train holding means is reset; and an operation prohibition signal for prohibiting the assignment operation to the signal train holding means is outputted when the signal train comparison means outputs a coincidence signal and an assignment of the input-output memory space is completed.

According to a fifth aspect of the present invention, there is obtained an assignment apparatus of input-output memory space as described in the second to fourth aspects; wherein:

the signal train holding means is composed of plural stages of shift registers corresponding to the number of signal train data constituting the signal train data group, and the signal train data held in the respective shift registers are shifted to the upper stage shift registers in turn according to a timing of a write-in signal from the computer, the signal train comparison means is composed of plural stages of comparators corresponding to the number of the plural stages of shift registers, and the signal train data of the signal train data group are respectively set in the plural stages of the comparators, and when the respective signal train data held in the respective shift registers coincides with the signal train data set in the respective comparators corresponding thereto, a coincidence signal is outputted.

According to the first aspect of the present invention, after the signal train data group comprising the combination of the signal train data deliberately determined for every system of the computer to be used and the signal train data set when a system is set up by any of the plurality of input-output devices is written in the storage area of the input-output device for assignment, the signal train data group are compared with the signal train data group previously stored in the input-output device, and only when they coincide with each other, an address assigned to the input-output device is read and held in the storage area.

According to the second aspect of the present invention, the plurality of input-output devices usable in the computer are detachably connected to the computer. When the signal train data group comprising the combination of the signal train data deliberately determined for every system of the computer and the signal train data set when a system is set up by any one of the plurality of input-output devices, is operated and inputted so as to be outputted on a data bus of the computer, the signal train holding means stores and holds therein the signal train data group on the data bus.

The signal train comparison means compares the signal train data group stored and held in the signal train holding means and the signal train data group previously set in the input-output device, and when they coincide with each other, the means outputs a coincidence signal. The address holding means writes and stores to hold therein an address on the address bus when a coincidence signal from the signal train comparison means is inputted, so that the input-output memory space is assigned to the input-output device.

Thereafter, when an address among addresses in an entire area of the input-output memory space outputted on the address bus, coincides with the address stored and held in the address holding means, the address comparison means outputs a tip selecting signal showing that the address is effective for the input-output device.

According to the third aspect, the input-output memory space assigned to the every input-output device is designated by a switch, and when a switching signal for making the contents of the switch effective is inputted to the address switching means from the switching means, the address switching means compares the contents of the switch and the address stored and held in the address holding means. And when they coincide with each other, the address at that time is outputted to the address comparison means.

DETAILED DESCRIPTION

Figure 1:
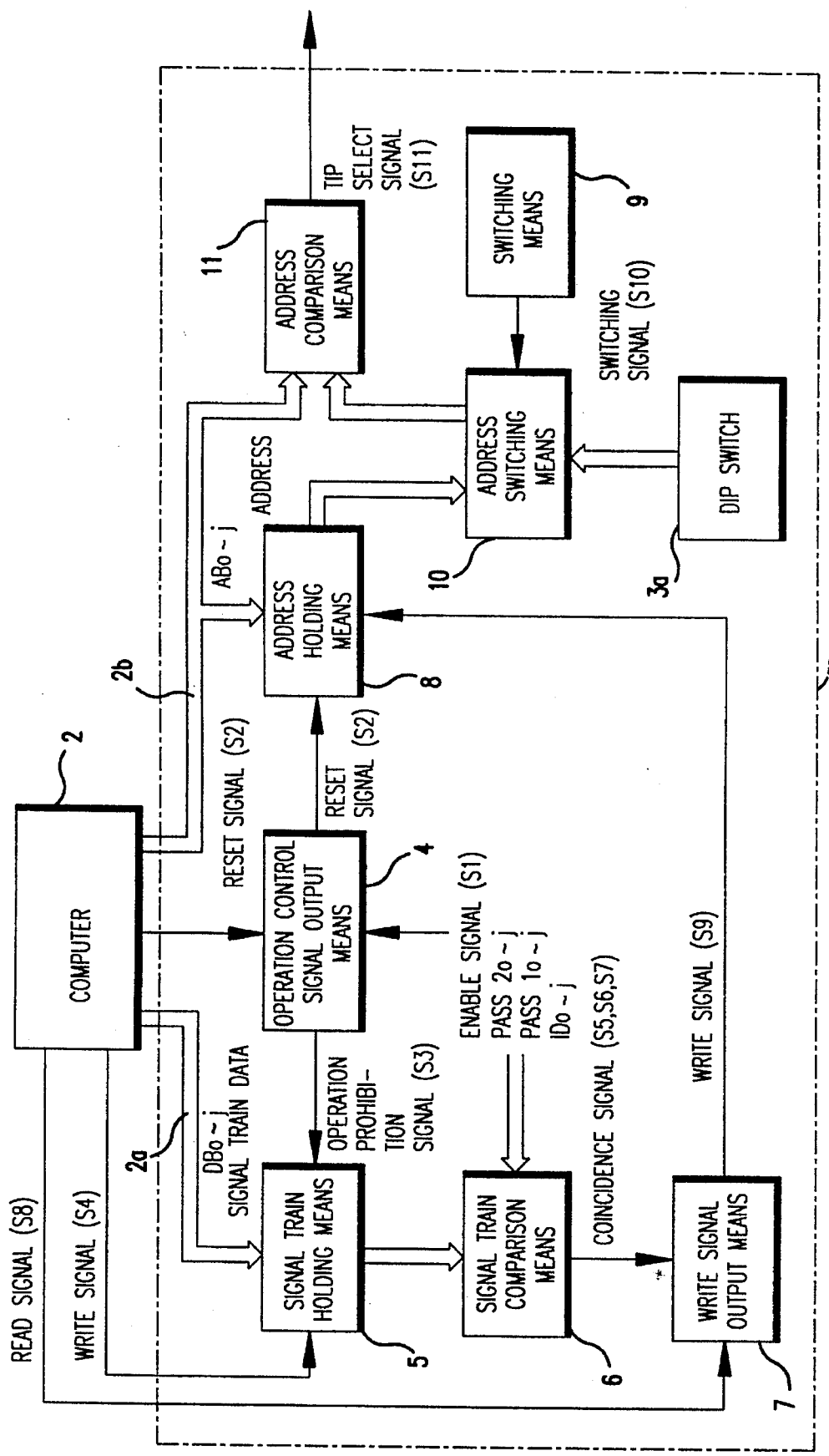
FIG. 1 is a block diagram showing an embodiment of an apparatus for assigning input-output memory space according to the present invention.
Figure 2:
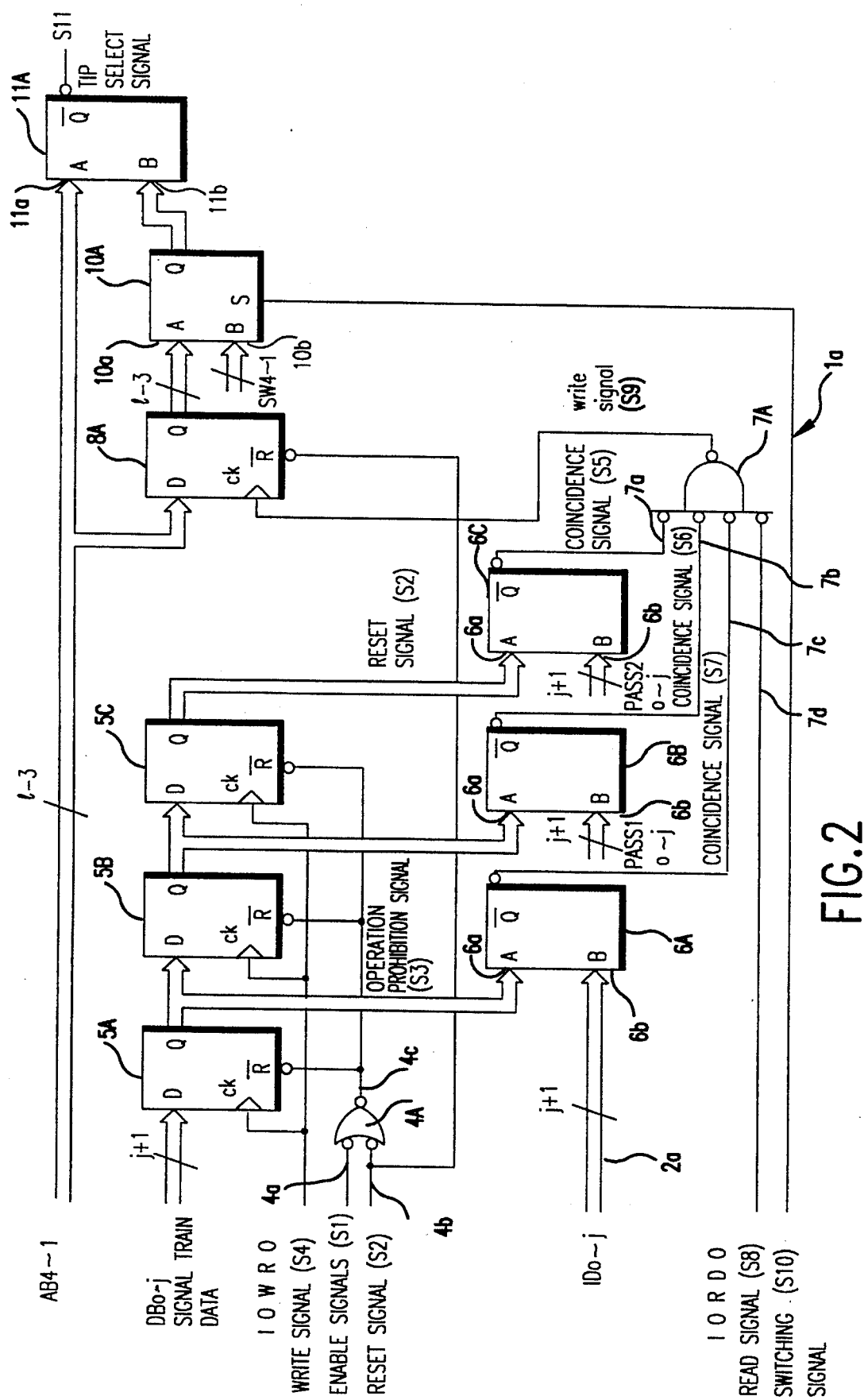
FIG. 2 is a diagram showing a specific circuitry of FIG. 1.
Figure 3:
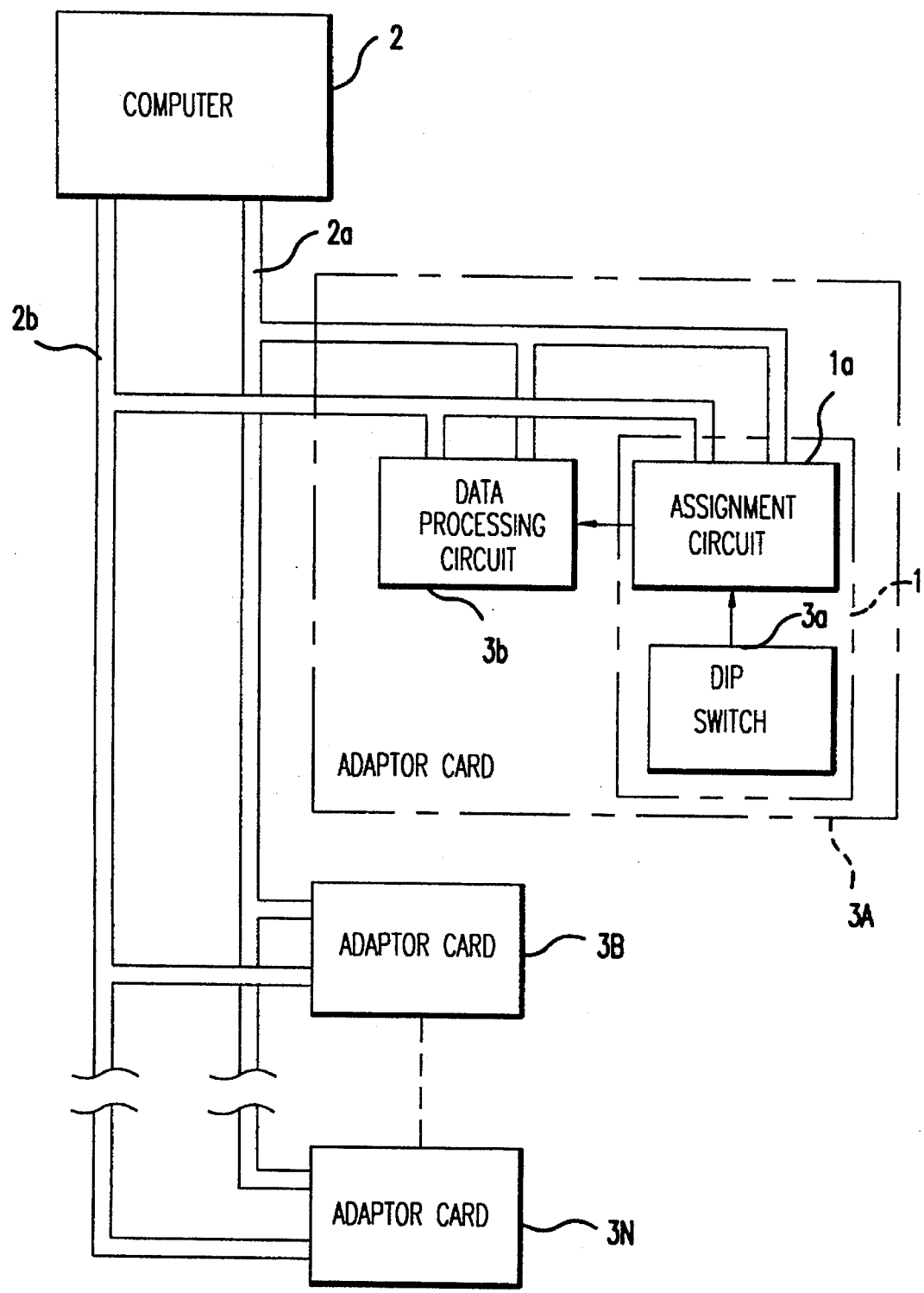
FIG. 3 is a diagram showing a structure for connecting adaptor cards to a computer.

FIG. 1 is a block diagram showing an embodiment of an apparatus for assigning input-output memory space according to the present invention, FIG. 2 is a diagram showing a specific circuitry of FIG. 1, and FIG. 3 is a diagram showing a structure for connecting adaptor cards to a computer.

An apparatus 1 for assigning input-output memory space according to the present embodiment is provided in each of adaptor cards 3 (3A, 3B, . . . , 3N) as an input-output device which are detachably provided to a computer 2. Each adaptor card 3 includes, in addition to an assignment circuit 1$a$ for assigning the input-output memory space of the computer 2 for each adaptor card 3, a dip switch 3$a$ which is operated at a time of selection of an address when the memory space is assigned, and a data processing circuit 3$b$ for performing functions (predetermined data processing) of the adaptor card 3, such as an image processing, communication processing and data collecting, at a time of operation of a system. Also, the respective adaptor cards 3 are connected parallel to the computer 2, as shown in FIG. 3, through a data bus 2$a$ and an address bus 2$b$ contained in a system bus of the computer 2.

Further, the assignment apparatus 1 contained in each of the adaptor cards 3 is formed of operation control signal output means 4, signal train holding means 5, signal train comparison means 6, write signal output means 7, address holding means 8, switching means 9, address switching means 10 and address comparison means 11.

The operation control signal output means 4 is composed of an AND circuit 4A having, for example, two input terminals 4a, 4b, wherein one input terminal 4a is inputted with an enable signal S1 for starting assignment of the input-output memory space. And, the other input terminal 4b is inputted with a reset signal S2 for resetting a signal train data group held in the signal train holding means 5 from the computer 2. The input terminal 4b is also connected to the address holding means 8 to reset an address held in the address holding means 8 when the reset signal S2: "0" is inputted from the computer 2 at the time of supplying a power source.

Further, an output terminal 4c is connected to the signal train holding means 5, and when the enable signal S1: "0" is inputted under a condition that the reset signal S2: "0" is inputted from the computer 2 at the time of supplying the power source, the signal train data group held in the signal train holding means 5 is reset, so that an operation for assigning the input-output memory space starts.

In explaining further, in the operation control signal output means 4, at a time of completion of the assignment of the input-output memory space for an objective adaptor card (for example, 3B, if it is a second card) among a plurality of adaptor cards 3A–3N, the enable signal S1 becomes "1", so that an operation prohibition signal S3 for prohibiting operation of the assignment is outputted to the signal train holding means 5 to thereby improve the security.

The signal train holding means 5 is composed of, for example, three-stage shift registers 5A, 5B, 5C of a D flip-flop, and a signal train data group of predetermined bits (i.e., j+1 bits) is inputted to a D terminal of the lower stage register 5A through the data bus 2a of the computer 2. And, a write signal S4 (IOWR) for writing the signal train data group with respect to the lower stage register 5A through the computer 2 is inputted to clock terminals CK of the respective registers 5A, 5B and 5C.

Here, the signal train data group comprises a combination of three signal train data including two fixed signal train data PASS1, PASS2 deliberately determined for every system of the computer 2 to be used, and a semi-fixed signal train data ID for every adaptor card 3 determined whenever a system is set up.

These fixed signal train data PASS1, PASS2, for example, are previously stored in a store section, not shown, at the time of manufacturing and delivery of the adaptor card 3, and the semi-fixed signal train data ID is previously set with some symbol in a store section, not shown, by an operator.

The fixed signal train data PASS1, PASS2 and the semi-fixed signal train data ID are inputted by the operator from the outside in the order of PASS2, PASS1 and ID when the input-output memory space is assigned.

Thus, at first, the fixed signal train data PASS2, then the fixed signal train data PASS1 and finally the semi-fixed signal train data ID are inputted to the D terminal of the lower stage register 5A. Then, whenever the write signal S4 from the computer 2 changes from "0" to "1", the respective signal train data is shifted to the next upper stage registers in turn. Finally, the fixed signal train data PASS2 is stored and held in the upper stage register 5C, the fixed signal train data PASS1 is stored and held in the middle stage register 5B, and the semi-fixed signal train data ID is stored and held in the lower stage register 5A.

The signal train comparison means 6 is composed of three comparators 6A, 6B, 6C corresponding to the respective registers 5A, 5B, 5C of the signal train holding means 5, and signal train data from the corresponding signal train holding means 5A, 5B, 5C is inputted to each input terminal 6a of the respective comparators 6A, 6B, 6C.

In describing further, the fixed signal train data PASS2 in the storage section of the adaptor card 3 to be used is previously inputted to the other input terminal 6b of the comparator 6C corresponding to the upper stage register 5C, and when the fixed signal train data PASS2 and the signal train data to be inputted to the input terminal 6a from the upper stage register 5C are compared and coincide with each other, a coincidence signal S5: "0" is outputted to the write signal outputting means 7.

Also, the fixed signal train data PASS1 in the storage section of the adaptor card 3 to be used is previously fixed and set to the other input terminal 6b of the comparator 6B corresponding to the middle stage register 5B, and when the fixed signal train data PASS1 and the signal train data inputted to the one input terminal 6a from the middle stage register 5B are compared and coincide with each other, a coincidence signal S6: "0" is outputted to the write signal outputting means 7.

Further, the semi-fixed signal train data ID of the storage section of the adaptor card 3 to be used is previously fixed and set in the other input terminal 6b of the comparator 6A corresponding to the lower stage register 5A, and when the semi-fixed signal train data ID and the signal train data inputted to the one input terminal 6a from the lower stage register 5A are compared and coincide with each other, a coincidence signal S7: "0" is outputted to the write signal output means 7.

The write signal outputting means 7 is composed of, for example, an AND circuit 7A including input terminals 7a, 7b, 7c, 7d, and the coincidence signals S5 to S7 from the respective comparators 6A to 6C of the signal train comparison means 6 are inputted to the three input terminals 7a to 7c, and a read signal S8 (IORD) from the computer 2 is inputted to the remaining input terminal 7d. And, the coincidence signals S5 to S7: "0" from the respective comparators 6A to 6C are inputted to the write signal outputting means 7, and when the read signal S8: "1" from the computer 2 is inputted thereto, a write signal S9: "1" is outputted to the address holding means 8.

The address holding means 8 is composed of, for example, a register 8A of a D flip-flop, and an address of the input-output memory space is inputted to a D terminal of the means 8 through the address bus 2b of the computer 2. The address previously programmed under a condition that the address is assigned to every adaptor card 3 usable in the computer 2 has been outputted on the address bus 2b. Further, write signal S9 from the write signal output means 7 is inputted to the clock terminal CK.

Then, in the address holding means 8, under a condition that the content of the address holding means 8 is reset by a reset signal S2: "0" from the operation control signal output means 4, whenever the write signal S9 from the write signal outputting means 7 changes from "0 to "1", an address assigned to the adaptor card 3 among addresses outputted on the address bus 2b is inputted through the D terminal, and is written and stored in the address holding means 8. The address is obtained from the computer 2, and specifically, the address is set in a program for operating the adaptor card 3.

The switching means 9, for example, is provided to the adaptor card 3 as a switch, or programmed to be provided in the adaptor card 3 or the computer 2, and the switching means switches whether the input-output memory space is assigned or not by the conventional dip switch 3a, by making the contents of the dip switch 3a effective. And, when the input-output memory space is assigned by the dip switch 3a, a switching signal S10: "1" is inputted to an S terminal of the address switch means 10. Incidentally, under a condition that the switching signal S10 inputted to the S terminal is "0", an address held in the address holding means 8 is inputted to the address comparison means 11 as it is.

The address switching means 10 is composed of a comparator 10A, and an address from the register 8A of the address holding means 8 is inputted to one terminal 10a thereof. And, a signal from the dip switch 3a which is set and operated so that memory spaces assigned to a plurality of adaptor cards 3 do not take the same memory space, is inputted to the other terminal 10b. And, in the address switching means 10, under a condition that the switching signal S10: "1" is inputted to an S terminal from the switching means 9, the contents of the dip switch 3a and the address held in the address holding means 8 are compared. When the contents coincide with each other, the address is outputted to the address comparison means 11.

The address comparison means 11 is composed of a comparator 11A, and an address is inputted to one terminal 11a thereof from the computer 2 through the address bus 2b. Also, an address outputted from an Q terminal of the comparator 10A of the address switching means 10 is inputted to the other terminal 11b. And, the address comparison means 11 compares the addresses inputted through both terminals 11a, 11b, and when they coincide with each other, the means 11 outputs a tip selecting signal S11 which is effective as an address of the input-output device 3.

Figure 4:
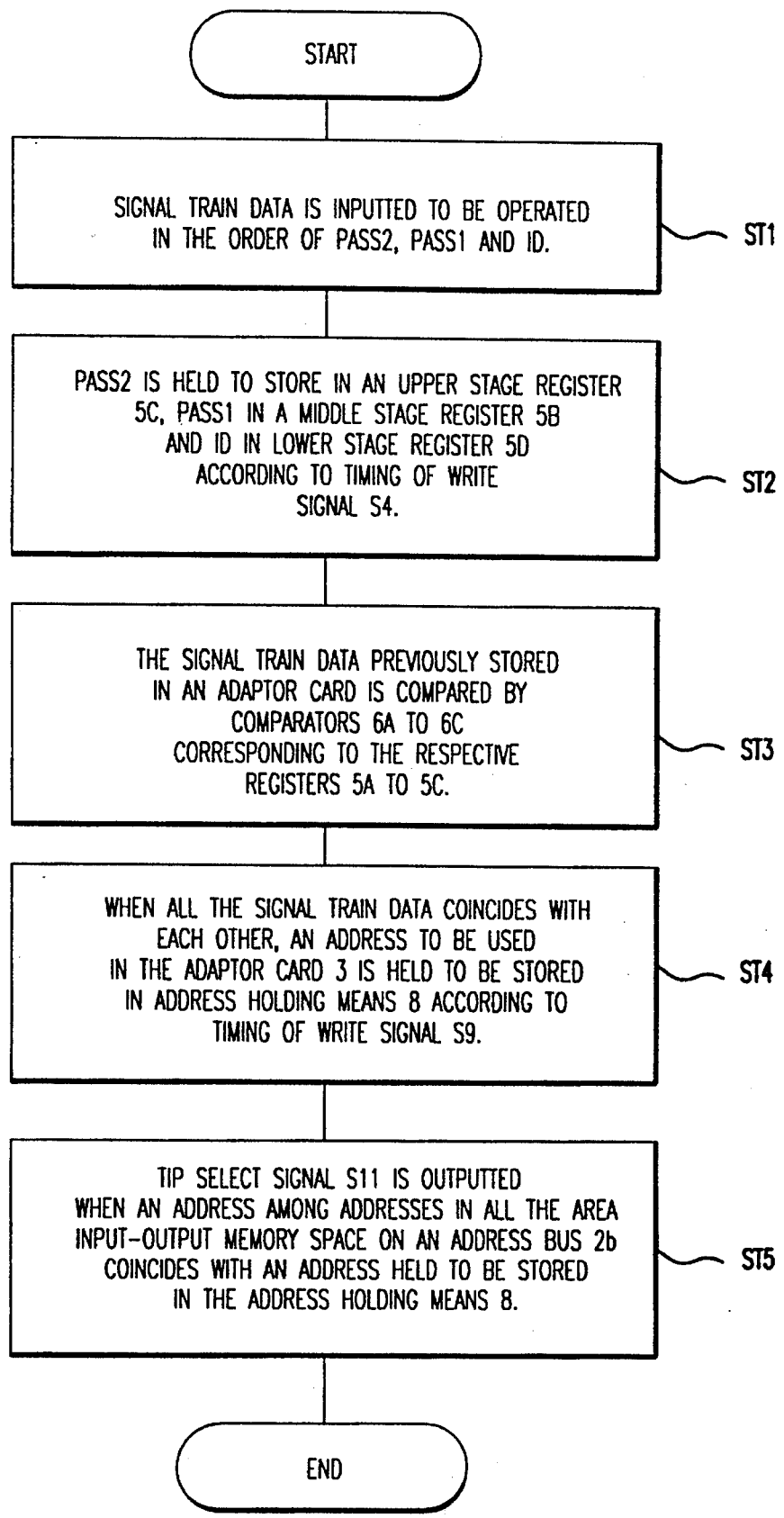
FIG. 4 is a flow chart showing an operation of an assignment apparatus according to the present invention.

Next, a method for assigning the input-output memory space having the above-mentioned structure is described with reference to a flow chart shown in FIG. 4 and a timing chart in FIG. 5.

First, the adaptor card 3 is incorporated in an extension slot of the computer 2.

Then, when a power source is turned on, the adaptor card 3 assigns input-output memory space under a condition of an enable signal S1 in FIG. 5(d) and a condition that a reset signal S2 in FIG. 5(e) is "1".

In describing the assignment operation, first, when the signal train data is inputted to the computer 2 by an operator in the order of PASS2 (da), PASS1(db), ID(dc) (ST1), the fixed signal train data PASS2 is first written in the lower stage register 5A of the signal train holding means 5 by the write signal S4 of FIG. 5(c) from the computer 2. Then, the fixed signal train data PASS1 is written, and finally the semi-fixed signal train data ID is written therein.

At this time, the respective signal train data are shifted to the registers in the upper stages whenever the write signal S4 changes from "0" to "1", and finally the fixed signal train data PASS2, the fixed signal train data PASS1 and the semi-fixed signal train data ID are written and stored in the upper stage register 5C, middle stage register 5B and lower stage register 5A, respectively (ST2).

Then, the signal train comparison means 6 sets and compares the signal train data previously stored in every adaptor card 3 to be used in the respective comparators 6A to 6C corresponding to the respective registers 5A to 5C of the signal train holding means 5 (ST3). More specifically, the upper stage comparator 6C compares the set and inputted fixed signal train data PASS2 and the signal train data from the upper stage register 5C, and when they coincide, a coincidence signal S5: "0" of FIG. 5(m) is outputted to the write signal output means 7.

Also, the middle stage comparator 6B compares the set and inputted fixed signal train data PASS1 and the signal train data from the middle stage register 5B, and when they coincide, a coincidence signal S6: "0" of FIG. 5(n) is outputted to the write signal output means 7.

Further, the lower step comparator 6A compares the set and inputted semi-fixed signal train data ID and the signal train data from the lower stage register 5A, and when they coincide, a coincidence signal S7: "0" of FIG. 5(o) is outputted to the write signal output means 7.

Next, when the write signal output means 7 is inputted with coincidence signals S5 to S7: "0" from all the comparators 6A to 6C of the signal train holding means 6 and the read signal S8 of FIG. 5 (i) from the computer 2, a write signal S9 of FIG. 5(l) is outputted to the address holding means 8. Then, an address (address aa corresponding to the presently used adaptor card) to be used in the adaptor card 3 which is being outputted on the address bus 2b from the computer 2 according to a timing of the write signal S9 is written in the address holding means 8 (ST4).

Through the above operations, an assignment of the input-output memory space has been set to the assignment apparatus 1 of the adaptor card 3.

Thereafter, if a switching signal S10 of FIG. 5(j) to be inputted to the S terminal of the switching means 9 is "0" the address held in the address holding means 8 is inputted to the address comparison means 11 as it is, and when the address is compared and coincides with an address of the input-output memory space outputted on the address bus 2b (addresses covering the entire area of the input-output memory space are outputted on the address bus 2b), a tip selecting signal S11 of FIG. 5(k) showing that the address is effective for the adaptor card 3 is outputted (ST5).

Through the operation, whenever an address corresponding to the input-output memory space assigned from the computer 2 is outputted, the data processing circuit 3b of the adaptor card 3 is operated.

Figure 5:
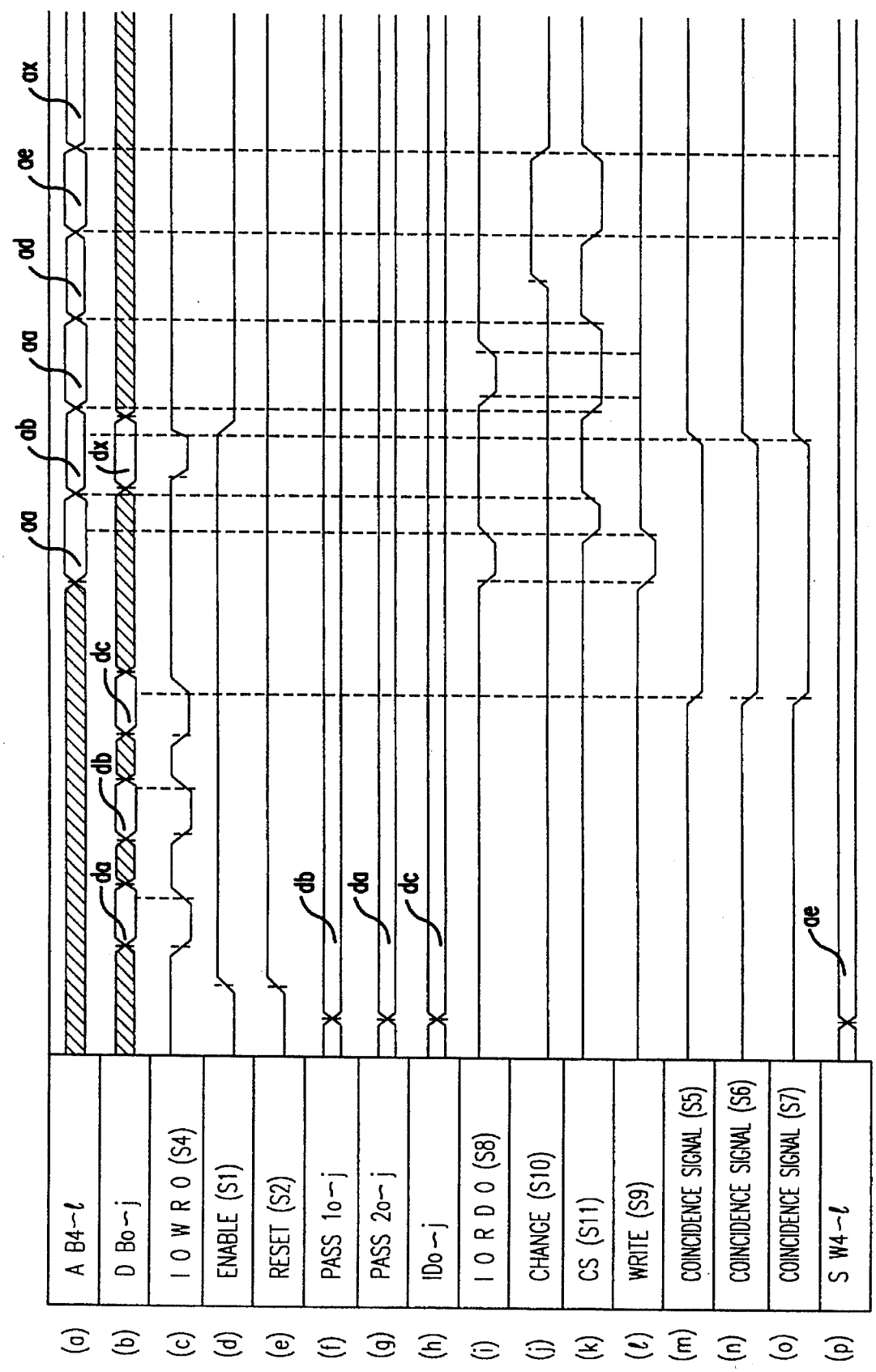
FIG. 5 is a timing chart of the assignment apparatus.

On the other hand, if the switching signal S10 of FIG. 5(j) inputted to the S terminal of the switching means 9 is "1", contents (ae) of the dip switch 3a of FIG. 5 (p) is compared with an address held in the address holding means 8 at the address switching means 10. Then, when both data coincide with each other, the address at that time is inputted to the address comparison means 11. When the address is compared and coincides with an address outputted on the address bus 2b, a tip selecting signal S11 of FIG. 5(k) showing that the address is effective for the adaptor card 3 is outputted.

And, when the tip selecting signal S11 is outputted, signal train data different from the fixed signal train data PASS2 is written in the lower stage register 5A of the signal train holding means 5, and the signal train data having been held in the signal train holding means 5 is broken, so that wrong use and an operation due to an erroneous input can be prevented.

Also, when the signal train data is broken and an enable signal S1 in the operation control signal output means 4 is shifted from "1" to "0", the signal train dada stored and held in the respective registers 5A to 5C of the signal train holding means 5 is reset.

Incidentally, during a time period until the signal train data different from the fixed signal train data PASS2 is written in the lower stage register 5A according to an output of the tip select signal S11, that is, while the signal train data is held in the order of PASS2, PASS1, ID from the upper stage register 5C of the signal train holding means 5, address writing to the address holding means 8 can be carried out repeatedly according to the timing of the write signal S9.

Therefore, in the above described embodiment, the signal train data comprising a combination of the two fixed signal train data PASS1, PASS2 deliberately and previously determined for every system and the semi-fixed signal data ID for every adaptor card 3 determined whenever a system is set up, is inputted to the computer so as to be continuously written in the input-output memory space for the adaptor card 3 for the purpose of assignment. When the written signal train data and signal train data previously stored and set in the adapter card 3 are compared and coincide with each other, read-in of the address with respect to the same input-output memory space is carried out more than one time based on the read-out signal S8 from the computer 2. Therefore, complicated operations requiring time and labour with reference to an instruction manual as conventionally practiced are not necessary, and the input-output memory space can be assigned with an extremely simple input operation for widely spread and used computers which use a plurality of adaptor cards to thereby improve operation efficiency.

Also, since the present invention is provided with a conventional dip switch 3a which enables the switching means 9 to selectively switch, an assignment of the input-output memory space can be carried out not only before or after a system is set up, but also by successively switching the dip switch 3.

Incidentally, in the above described embodiment, although a case where the signal train data to be operated and inputted are PASS1, PASS2 and ID has been described, the number is not limited to three. For example, when the number of registers 5A to 5C is increased to 5A to 5E, a length of the signal train is changed to PASS1, PASS2, PASS3, ID1 and ID2, whereby the same function as in the above-described embodiment can be obtained.

As described hereinabove, according to the present invention, an assignment of input-output memory space can be positively and easily carried out for widely spread and used computers in which a plurality of adaptor cards as an input-output device is used. And, since the above-mentioned input operation is conducted such that a previously set signal train data group is programmably operated from a main computer, without forming a specific structure, a setting operation for the assignment can be extremely easily carried out and the assignment can be easily changed.

Also, the assignment of the input-output memory space can be performed not only before or after a system is set up, but also by successively switching a switch as conventionally practiced.

Further, when the assignment of the input-output memory space is completed, the assigning operation with respect to the signal train holding means is prohibited to thereby improve the security.

What is claimed is:

1. In an assignment apparatus of input-output memory space for selectively assigning a plurality of input-output devices to be connected to a computer to the memory space in a predetermined range, said assignment apparatus comprising:

signal train holding means wherein a signal train data group comprising a combination of signal train data deliberately determined for every system of said computer outputted on a data bus from said computer through an operational input and signal train data at a time when a system is set up by any of said plurality of input-output devices, is written in a storage area of the input-output device and stored to hold therein;

signal train comparison means for outputting a coincidence signal when the signal train data group stored and held in said signal train holding means and a signal train data group previously set in the input-output device are compared and coincide with each other;

address holding means for writing and storing an address on an address bus according to timing of a read-out signal from said computer when the coincidence signal is being inputted from the signal train comparison means; and address comparison means for outputting a tip selecting signal showing that the address is effective for said input-output device when the address stored and held in said address holding means and an address for an entire area of the input-output memory space are compared and coincide with each other.

2. An assignment apparatus of input-output memory space as claimed in claim 1, further comprising:

a switch for designating the input-output memory space assigned for every input-output device;

switching means for outputting a switching signal for making content of said switch effective; and address switching means for outputting to said address comparison means an address when the content of said switch and the address stored and held in said address holding means are compared and coincide with each other, upon receipt of the switching signal from said switching means.

3. An assignment apparatus of input-output memory space as claimed in claim 1, further comprising operation control signal output means, said operation control signal output means being actuated such that an enable signal for starting assignment of the input-output memory space and a reset signal from said computer at a time of supplying a power source are an input signal; an operation for assigning the input-output memory space is started when the signal train data group held in the signal train holding means is reset; and an operation prohibition signal for prohibiting an assignment operation with respect to said signal train holding means is outputted when said signal train comparison means outputs the coincidence signal and assignment of memory space for the input-output device is completed.

4. An assignment apparatus of input-output memory space as claimed in claim 1, wherein:

said signal train holding means is composed of plural stages of shift registers corresponding to a number of signal train data constituting said signal train data group, and signal train data held in the respective shift registers are shifted to the shift registers at upper stages in turn according to a timing of write signal from said computer, said signal train comparison means is composed of plural stages of comparators corresponding to a number of said plural stages of the shift registers, and the signal train data of said signal train data group are respectively set in said plural stages of the comparators, and when the respective signal train data held in said respective shift registers coincide with the signal train data set in said respective comparators corresponding thereto, a coincidence signal is outputted.

* * * * *